US009696067B2

(12) United States Patent
Rite et al.

(10) Patent No.: US 9,696,067 B2
(45) Date of Patent: Jul. 4, 2017

(54) APPARATUS AND METHOD FOR CONTROLLING INDOOR AIRFLOW FOR HEAT PUMPS

(71) Applicant: Trane International Inc., Piscataway, NJ (US)

(72) Inventors: Raymond Walter Rite, Tyler, TX (US); Don Alan Schuster, Lindale, TX (US); Drew Whitehurst, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 264 days.

(21) Appl. No.: 14/480,387

(22) Filed: Sep. 8, 2014

(65) Prior Publication Data

US 2015/0068226 A1 Mar. 12, 2015

Related U.S. Application Data

(60) Provisional application No. 61/875,027, filed on Sep. 7, 2013.

(51) Int. Cl.
| | |
|---|---|
| *F25B 49/00* | (2006.01) |
| *F25B 30/02* | (2006.01) |
| *F25D 17/06* | (2006.01) |
| *F25B 13/00* | (2006.01) |
| *F24D 5/04* | (2006.01) |

(Continued)

(52) U.S. Cl.
CPC .............. *F25B 30/02* (2013.01); *F24D 5/04* (2013.01); *F24D 5/12* (2013.01); *F24D 19/1087* (2013.01); *F25B 13/00* (2013.01); *F25B 49/02* (2013.01); *F25B 2313/0315* (2013.01); *F25B 2700/171* (2013.01)

(58) Field of Classification Search
CPC ...... F25B 49/00; F25B 30/02; F25B 2600/11; F25B 13/00; F25B 2700/171; F25B 49/02; F25B 2313/0315; F25D 17/06; F24D 5/04; F24D 19/1087; F24D 5/12
USPC ..................................................... 62/79, 186
See application file for complete search history.

(56) References Cited

U.S. PATENT DOCUMENTS

| 31,281 | A | * | 1/1861 | Swenson et al. ...... A43D 85/00 |
| | | | | 12/57 |
| 3,906,253 | A | * | 9/1975 | Farley ..................... F25B 21/02 |
| | | | | 165/265 |

(Continued)

*Primary Examiner* — Mohammad M Ali
(74) *Attorney, Agent, or Firm* — Taft Stettinius & Hollister LLP

(57) ABSTRACT

An apparatus and method for controlling the heating of an airflow. According to certain embodiments, the temperature of an outdoor heat exchanger and the speed of a compressor are used to determine a blower speed for a variable speed indoor air blower. The selected blower speed may facilitate a flow of air across a second, indoor heat exchanger at an indoor volumetric flow rate that heats the airflow to a leaving air temperature. The leaving air temperature may at least seek to attain the temperature of a variable target leaving air temperature that is adjusted based on changes in outdoor ambient temperatures. Additionally, according to certain embodiments, the blower speed may be based on an indoor volumetric airflow rate that is determined, at least in part, on a determined system heating capacity and a temperature at the outdoor heat exchanger.

22 Claims, 4 Drawing Sheets

(51) Int. Cl.
  *F24D 5/12* (2006.01)
  *F24D 19/10* (2006.01)
  *F25B 49/02* (2006.01)

(56) References Cited

U.S. PATENT DOCUMENTS

| | | | | |
|---|---|---|---|---|
| 4,257,238 A * | 3/1981 | Kountz | ............... | F24F 11/0009 62/176.3 |
| 4,603,556 A * | 8/1986 | Suefuji | ............... | F24D 19/1087 62/180 |
| 5,081,846 A * | 1/1992 | Dudley | ............... | F24D 19/1072 62/115 |
| 5,144,812 A * | 9/1992 | Mills, Jr. | ............... | F24F 1/06 62/186 |
| 5,628,201 A * | 5/1997 | Bahel | ............... | F24F 11/0076 62/211 |
| 5,673,568 A * | 10/1997 | Isshiki | ............... | F24F 11/0009 62/157 |
| 6,907,745 B2 | 6/2005 | Turner et al. | | |
| 2001/0054293 A1 * | 12/2001 | Gustafson | ............... | F25B 49/02 62/183 |
| 2005/0109490 A1 * | 5/2005 | Harmon | ............... | F24F 5/0096 165/133 |
| 2007/0199338 A1 * | 8/2007 | Evans | ............... | B60H 1/3213 62/228.4 |
| 2009/0113908 A1 * | 5/2009 | Hwang | ............... | F24F 11/0079 62/228.1 |
| 2011/0016896 A1 * | 1/2011 | Oomura | ............... | B60H 1/00785 62/155 |
| 2011/0174002 A1 * | 7/2011 | Jang | ............... | F25B 13/00 62/115 |
| 2012/0010753 A1 * | 1/2012 | Schuster | ............... | F25B 49/02 700/276 |
| 2012/0090337 A1 * | 4/2012 | Chen | ............... | F25B 30/02 62/79 |
| 2012/0260679 A1 * | 10/2012 | Huerta-Ochoa | ............... | F25B 41/062 62/56 |
| 2013/0104584 A1 * | 5/2013 | Takizawa | ............... | F25B 1/10 62/228.1 |
| 2013/0160470 A1 * | 6/2013 | Schuster | ............... | F25B 45/00 62/77 |

* cited by examiner

APPARATUS AND METHOD FOR CONTROLLING INDOOR AIRFLOW FOR HEAT PUMPS

CROSS REFERENCE TO RELATED APPLICATIONS

The present application claims the benefit of U.S. Provisional Patent Application Ser. No. 61/875,027, filed Sep. 7, 2013, which is incorporated herein by reference in its entirety.

BACKGROUND

Embodiments of the present invention generally relate to controlling the indoor airflow for heat pump systems. More particularly, embodiments of the present invention relate to controlling a leaving air temperature when the heat pump is operating in a heating mode.

When heating systems operate in dwellings, the temperature of the air entering the occupant zone has a significant impact on occupant comfort. If the air is not of the proper temperature, many occupants will experience some level of discomfort. Certain conventional heat pump systems have constant airflow rates based on the nominal heating capacity delivered. Nominal heating capacity is generally gauged at an outdoor temperature of 47° Fahrenheit and with an ice-free outdoor heat exchange coil.

As the outdoor temperature drops and/or frost develops on the outdoor heat exchange coil, the actual heating capacity of the system typically drops. Further, the temperature of the air leaving the heat pump condenser may depend upon the heat pump heating capacity, the temperature of the air entering the condenser, and the airflow across the condenser coil. This relationship can be expressed as:

$$T_L = T_E + \frac{Q}{\dot{V} * c}$$

wherein $T_L$ is the temperature of the air leaving the condenser (for example, to be discharged to an occupied space), $T_E$ is the temperature of the air entering the condenser (for example, recirculated from the occupied space), Q is the condenser heating capacity of the system, $\dot{V}$ is the volumetric airflow rate, and c is a constant combining unit conversions and specific heat of dry air. As is evident from the above equation, when the heating capacity (Q) of the system drops, so does the leaving air temperature ($T_L$), assuming a fixed airflow rate. Should the heating capacity (Q) drop too low, the leaving air temperature ($T_L$) may fall to a temperature that many occupants may consider uncomfortable. This problem can be compounded as ice forms on the outdoor heat exchange coil, further decreasing the heating capacity (Q) of the system.

Some conventional systems provide a variable airflow based on outdoor ambient temperature. For example, a traditional system may monitor the ambient outdoor temperature, and when the ambient outdoor temperature changes, the speed of the indoor fan may be adjusted so as to maintain the supply air temperature at a constant level over the operating range of the unit. Yet, a shortcoming of such an approach is that as ice forms on the outdoor heat exchange coil, the heating capacity of the system diminishes. Yet, while the heating capacity of such systems is decreased due to the formation of ice on the coil, because the monitored outdoor ambient temperature generally remains the same, the airflow can remain unchanged. As a consequence, the leaving air temperature ($T_L$) may drop, leading to reduced occupant comfort.

As is evident from the foregoing, present heat pump systems suffer from a variety of disadvantages and problems including, among others, those respecting control of the leaving air temperature. There is a need for the unique heat pump control apparatuses, systems and methods disclosed herein.

BRIEF SUMMARY

An aspect of the present invention is a method for heating an airflow, the method including sensing a temperature of a first heat exchanger and identifying a speed of a compressor, the compressor being adapted to compress a refrigerant. Additionally, a blower speed for an air blower is determined using the sensed temperature of the first heat exchanger and the determined speed of the compressor. Further, the air blower is operated at the determined blower speed to direct a flow of air across a second heat exchanger to heat the airflow.

Another aspect of the present invention is a method for providing a heated airflow. The method includes sensing a heat exchanger temperature of a first heat exchanger and determining a system heating capacity. According to certain embodiments, the system heating capacity may be based at least in part on a sensed outside ambient temperature and a speed of a compressor, the compressor being adapted to compress a refrigerant. The method further includes determining an indoor volumetric airflow flow rate for a flow of air across a second heat exchanger. A blower speed is determined for an air blower based at least in part on the determined volumetric airflow rate and the heat exchanger temperature, and the air blower is operated at the determined blower speed to direct the flow of the air across the second heat exchanger.

Additionally, an aspect of the present invention is an apparatus for heating an airflow using a refrigerant. The apparatus includes a compressor that is adapted to operate at a compressor speed to compress the refrigerant. The apparatus also includes a first heat exchanger that is in fluid communication with both the compressor and a second heat exchanger, and a temperature sensor that is positioned to sense a temperature of the first heat exchanger. Additionally, the apparatus includes an air blower that is adapted to operate at one or more variable blower speeds, the air blower being further adapted to facilitate a flow of air across at least a portion of the second heat exchanger. A command apparatus having a memory is adapted to determine the one or more variable blower speeds for operation of the air blower based on the compressor speed and the temperature of the first heat exchanger.

Further, an exemplary method of controlling the airflow across an indoor heat exchanger includes varying the airflow based at least in part upon the outdoor heat exchanger/refrigerant temperature and the current heating capacity of the system. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views.

Figure 1:
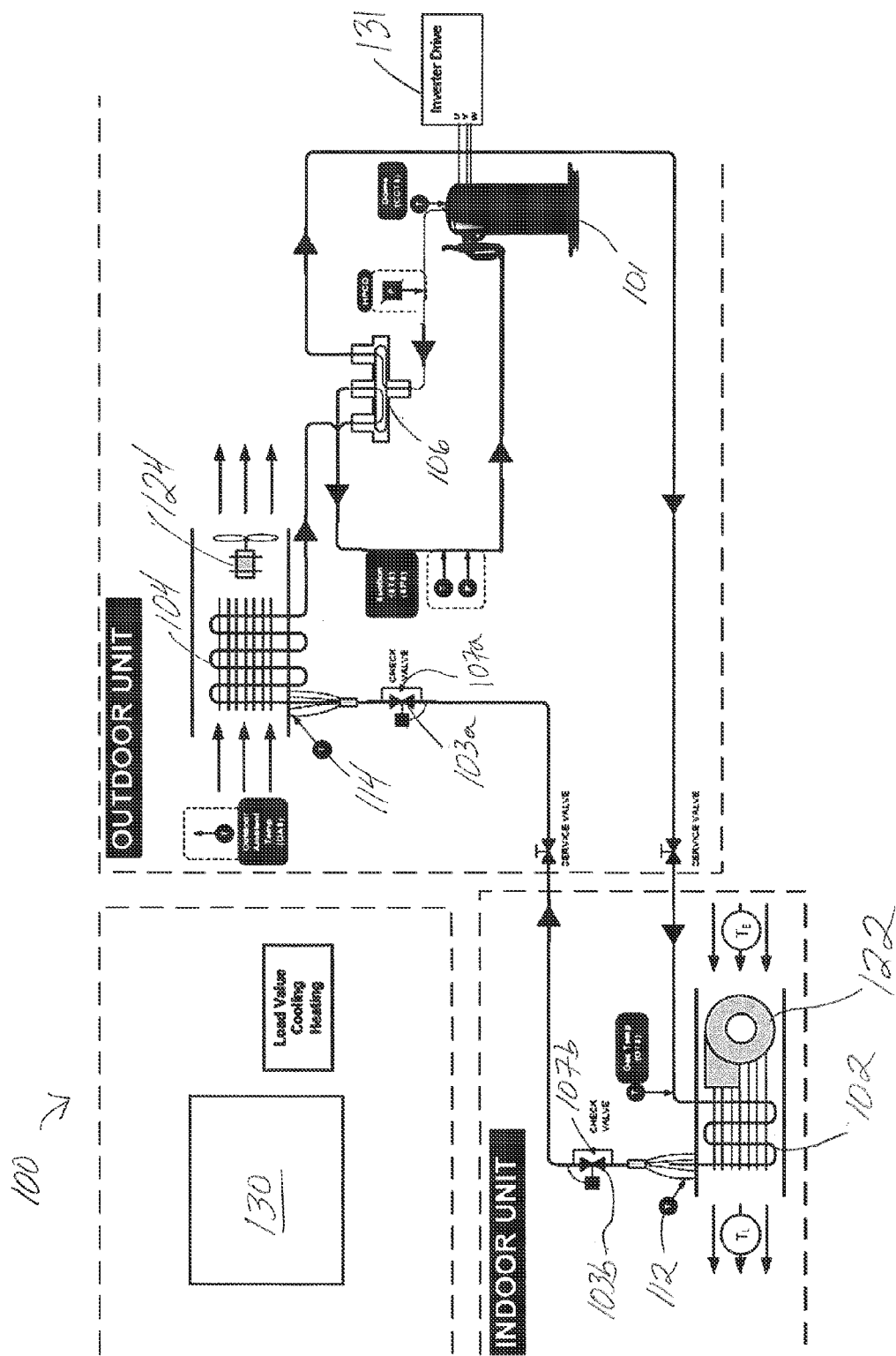
FIG. 1 illustrates a schematic diagram of an exemplary heat pump system according to an embodiment of the invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an exemplary vapor compression heat pump system 100 is shown in a heating mode. In the heating mode, a refrigerant is compressed by a compressor 101, rejects heat at an indoor heat exchanger 102, expands in a first expansion valve 103a, accepts heat at an outdoor heat exchanger 104, and returns to the compressor 101. The indoor and outdoor heat exchangers 102, 104 may take a variety of different forms and/or be a variety of different types of heat exchangers. For example, according to the illustrated embodiment, the indoor and outdoor heat exchangers 102, 104 may be an indoor heat exchange coil and an outdoor heat exchange coil, respectively. Further, when the system 100 is operating in the heating mode, the indoor heat exchanger 102 may function as a condenser, and the outdoor heat exchanger 104 may function as an evaporator.

In the illustrated form, the system 100 also includes a four-way valve 106 operable to change the mode of the system 100 between the illustrated heating mode and a cooling mode (not illustrated). In the cooling mode, the position of the four-way valve 106 is altered, and the refrigerant is compressed by the compressor 101, accepts heat at the indoor heat exchanger 102, expands in a second expansion valve 103b, rejects heat at the outdoor heat exchanger 104, and returns to the compressor 101. In the cooling mode, the indoor heat exchanger 102 acts as an evaporator, and the outdoor heat exchanger 104 acts as a condenser.

In the illustrated embodiment, each of the expansion valves 103a, 103b is connected in parallel with a check valve 107a, 107b, such that the refrigerant flows only through the first expansion valve 103a in the heating mode, and only through the second expansion valve 103b in the cooling mode. It is also contemplated that a system 100 may employ a single reversible expansion valve. It is further contemplated that a system 100 may be operable only in the heat mode.

The system 100 further includes an outdoor heat exchanger temperature sensor 114 thermally coupled to the outdoor heat exchanger 104. According to certain embodiments, the outdoor heat exchanger temperature sensor 114 may at least assist in determining the temperature of the outdoor heat exchanger 104, such as, for example by sensing the temperature of the outdoor heat exchanger 104. Further, the temperature of the outdoor heat exchanger 104 may correspond to, or otherwise provide an indication of, the temperature of the refrigerant being received by the outdoor heat exchanger 104. However, the outdoor heat exchanger temperature sensor 114 may be positioned at a variety of locations, and thus, according to different embodiments, the temperature determined, such as, for example, sensed through use of the outdoor heat exchanger temperature sensor 114 may correspond to the temperature of the refrigerant that is being received by, or exhausted from, the outdoor heat exchanger 104. Alternatively, according to other embodiments, the temperature of the outdoor heat exchanger 104 may be determined through use of a pressure sensor. For example, according to certain embodiments, a pressure sensor may be positioned to sense the pressure of refrigerant at or around an inlet or an outlet of at least a portion of the outdoor heat exchanger 104. More specifically, according to the illustrated embodiment, pressure of the refrigerant may be sensed by the pressure sensor at or around the inlet or outlet of an outdoor evaporator. The sensed pressure may then be correlated to a temperature of the refrigerant, such as, for example, a saturated temperature of the refrigerant.

The system 100 may also include an indoor heat exchanger temperature sensor 112 that is thermally coupled to the indoor heat exchanger 102. According to the illustrated embodiment, the indoor and outdoor heat exchanger temperature sensors 112, 114 are configured to sense the temperature of the refrigerant at the outlet of the evaporator and at the inlet of the condenser. That is to say, according to the illustrated embodiments in which the system 100 is being operated in the heating mode, the indoor heat exchanger temperature sensor 112 senses the refrigerant temperature at the inlet of the indoor heat exchanger 102 (acting as the condenser) and the outdoor heat exchanger temperature sensor 114 senses the refrigerant temperature at the inlet of the outdoor heat exchanger 104 (acting as the evaporator). Further, according to the illustrated embodiment, the indoor and outdoor heat exchanger temperature sensors 112, 114 may be coil temperature sensors. Additionally, according to certain embodiments, each of the sensors 112, 114 is in communication with a controller 130 and/or an inverter drive 131, and is configured to transmit data indicative of the sensed temperature thereto.

The system 100 also includes an indoor blower 122 configured to flow air over the indoor heat exchanger 102, and an outdoor blower 124 configured to flow air over the outdoor heat exchanger 104. According to the illustrated embodiment, the indoor blower 122 is a variable speed blower, the speed of which is controlled by commands from an inverter drive 131. Moreover, the system 100 and/or components therein may be adapted to vary the speed of the indoor blower 122, and thereby control the airflow across the indoor heat exchanger 102.

According to the illustrated embodiment, the inverter drive 131 is configured to receive information, to determine commands, and to issue the determined commands. In certain embodiments, the inverter drive 131 forms a portion of a processing subsystem including one or more computing devices having memory, processing, and communication hardware. The inverter drive 131 may be a single device or a distributed device, and the functions of the inverter drive 131 may be performed by hardware or software. The inverter drive 131 may receive data by any known method, including at least receiving values from a datalink or network communication, receiving an electronic signal (e.g. a voltage, frequency, current, or PWM signal) indicative of the value(s), receiving a software parameter indicative of the value(s), reading the value(s) from a memory location on a computer readable medium, receiving the value(s) as a run-time parameter by any means known in the art, receiving a value(s) by which the parameter can be calculated, and/or referencing a default value(s) that is interpreted to be the parameter value(s).

According to certain embodiments, the controller 130 is adapted to sense room temperature and determine system demand. Additionally, according to certain embodiments, the inverter drive 131 accepts a demand command from the controller 130 corresponding to the determined system demand, determines compressor speed and airflows using (at least in part) the demand command, and issues commands to individual components of the system 100. Further, according to certain embodiments, at a minimum, the inverter drive 131 determines and issues speed commands to the indoor blower 122, such that the inverter drive 131 controls the airflow across the indoor heat exchanger 102. The inverter drive 131 may additionally control operation of other elements of the system 100, such as, for example, the compressor 101 and/or the four way valve 106. As previously noted, the temperature of the air leaving the indoor heat exchanger 102 (which is used to condition the occupied space) depends in part upon the airflow that flows across the indoor heat exchanger 102. Thus, by issuing an appropriate blower speed command, the inverter drive 131 is able to vary the leaving air temperature ($T_L$).

Figure 2:
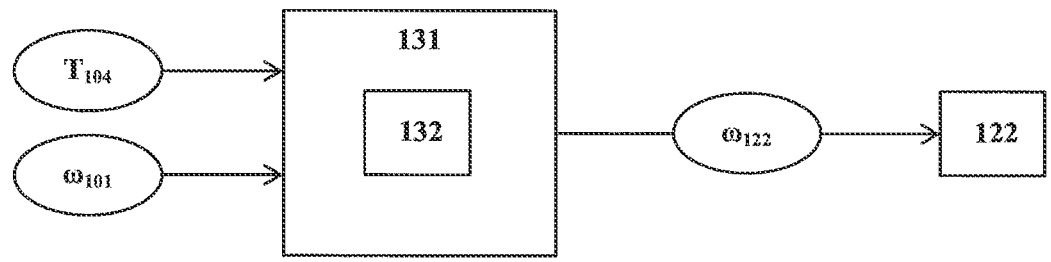
FIG. 2 illustrates a schematic diagram of a controller selecting a blower speed from an airflow lookup table.

Referencing FIG. 2, the inverter drive 131 includes memory having stored thereon a lookup airflow table 132. In the illustrated form, the airflow table 132 includes values indicative of desired blower speeds for the indoor blower 122 using the outdoor heat exchanger temperature $T_{104}$ and the compressor speed $\omega_{101}$ as indices. However, in other embodiments, different indices may be employed. As previously discussed, according to certain embodiments, the outdoor heat exchanger temperature $T_{104}$ may correspond to, or otherwise reflect, the temperature of refrigerant being received by, or depending on the embodiment, exhausted from, the outdoor heat exchanger 104. In the illustrated embodiment, the inverter drive 131 selects a blower speed $\omega_{122}$ for the indoor blower 122 from the airflow table 132 based upon the received data relating to the outdoor heat exchanger temperature $T_{104}$ and the compressor speed $\omega_{101}$. The inverter drive 131 may then issue a blower speed command corresponding to the selected blower speed $\omega_{122}$ to the indoor blower 122 using any known technique.

Figure 3:
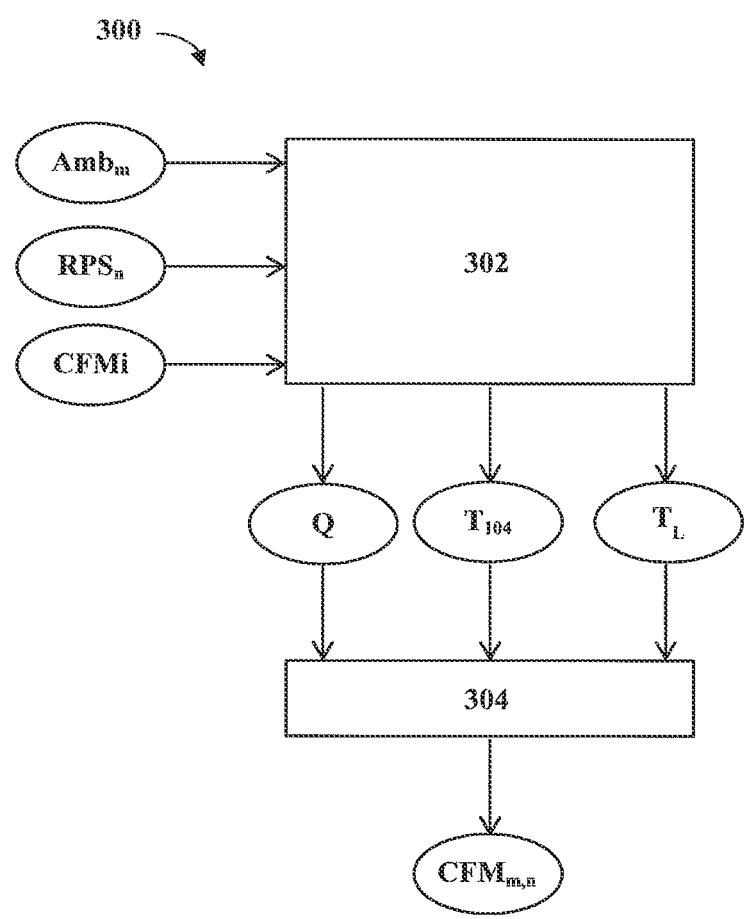
FIG. 3 illustrates a schematic flow diagram of a process for creating an airflow lookup table.

FIG. 3 provides an illustrative schematic of a process 300 for developing an airflow table, such as, for example, the airflow table 132 provided by the graph in FIG. 2. The operations illustrated in FIG. 3 and discussed below are understood to be exemplary only, and operations may be combined or divided, and added or removed, as well as re-ordered in whole or in part. Additionally, rather than developing an airflow table 132 that seeks to provide a relatively constant air temperature, certain embodiments of the present invention seek to improve occupant comfort by providing a leaving air temperature $T_L$ at a target leaving air temperature $T_{TL}$ that varies as a function of the outdoor ambient temperature.

For example, at relatively low-range ambient temperatures, such as, for example, ambient temperatures less than about 5° Fahrenheit (F), the walls of a dwelling that is utilizing, the heating of the system 100 are generally quite cold, which may result in increased radiant heat losses from the human body. At such low temperatures, heat pumps may often be highly inefficient. As such, heat pump systems such as the exemplary system 100 generally utilize a supplemental heat source (not illustrated) to achieve the appropriate leaving air temperature. The supplemental heat may be used in addition to the heat from the heat pump, or the system 100 may include controls to turn off the heat pump circuit and use only the supplemental heat. In the illustrated form, the target leaving air temperature ($T_{TL}$) for the low-range ambient temperatures may be, for example, about 90° Fahrenheit to about 100° Fahrenheit At mid-range ambient outdoor temperatures, such as, for example, temperatures from about 5° Fahrenheit to about 40° Fahrenheit, the system 100 may run or operate for long periods of time, and occupant comfort may be impacted more than at the higher heating ambients. This is because the walls are cooler, and radiant losses from the body are still typically higher then when ambient outdoor temperatures are above such mid-range temperatures. Thus, the relatively higher leaving air temperature ($T_L$) typically provides more comfort for the occupants. In the illustrated form, the target leaving air temperature $T_{TL}$ for the mid-range ambient temperatures may be, for example, about 100° Fahrenheit to about 105° Fahrenheit. Yet, in general, the lower indoor airflow and higher leaving air temperature ($T_L$) results in lower system efficiency.

At higher-range ambient outdoor temperatures, such as, for example, temperatures greater than about 40° Fahrenheit, the walls of the dwelling are generally warmer, resulting in less radiant heat loss from the human body. Thus, compared to low-range and mid-range ambient outdoor temperatures, the leaving air temperature ($T_L$) during higher-range ambient outdoor temperatures can be reduced, which may increase system efficiency with minimal negative impact to the dwelling occupant's comfort. In the illustrated form, the target leaving air temperature ($T_{TL}$) for the higher range ambient temperatures may be, for example, about 95° Fahrenheit to about 100° Fahrenheit.

According to certain embodiments, an airflow development process 300 may include an operation 302 wherein the functions of a heat pump system, such as the exemplary system 100, are modeled. In each iteration of the process 300, the model is provided with an outdoor ambient temperature ($Amb_m$), a compressor speed ($RPS_n$), and assumed indoor airflow (CFMi). In a heat pump system such as system 100, the compressor speed in combination with the outdoor coil/refrigerant temperature may provide a relatively accurate predictor of system heating capacity.

In the illustrated form, the system heating capacity is determined based upon the speed of the compressor 101 and the temperature of outdoor heat exchanger 104, which again may be the same as the temperature of refrigerant at the outdoor heat exchanger 104, although additional or alternative bases may be used. For example, in certain embodiments, the system heating capacity may be determined based at least in part upon suction pressure, saturated suction temperature based on suction pressure, suction gas temperature, and/or compressor motor torque or current, among other bases.

According to certain embodiments, in an effort to simplify the modeling in operation 302, certain assumptions regarding the functioning of the system 100 may be made. Such assumptions may include, for example, one or more of the following: a constant entering air temperature ($T_E$), for example 70° Fahrenheit; the outdoor heat exchanger 104 is free of ice and other debris; the system 100 is operating at steady state; airflow across the outdoor heat exchanger 104 is kept constant below a predetermined temperature, for example, 17° Fahrenheit; and the indoor blower 122 has minimum and maximum airflow levels which can be reliably delivered. The primary outputs of the development modeling in operation 302 include system heating capacity (Q), outdoor heat exchanger/refrigerant temperature $T_{104}$, and leaving air temperature ($T_L$).

Figure 4:
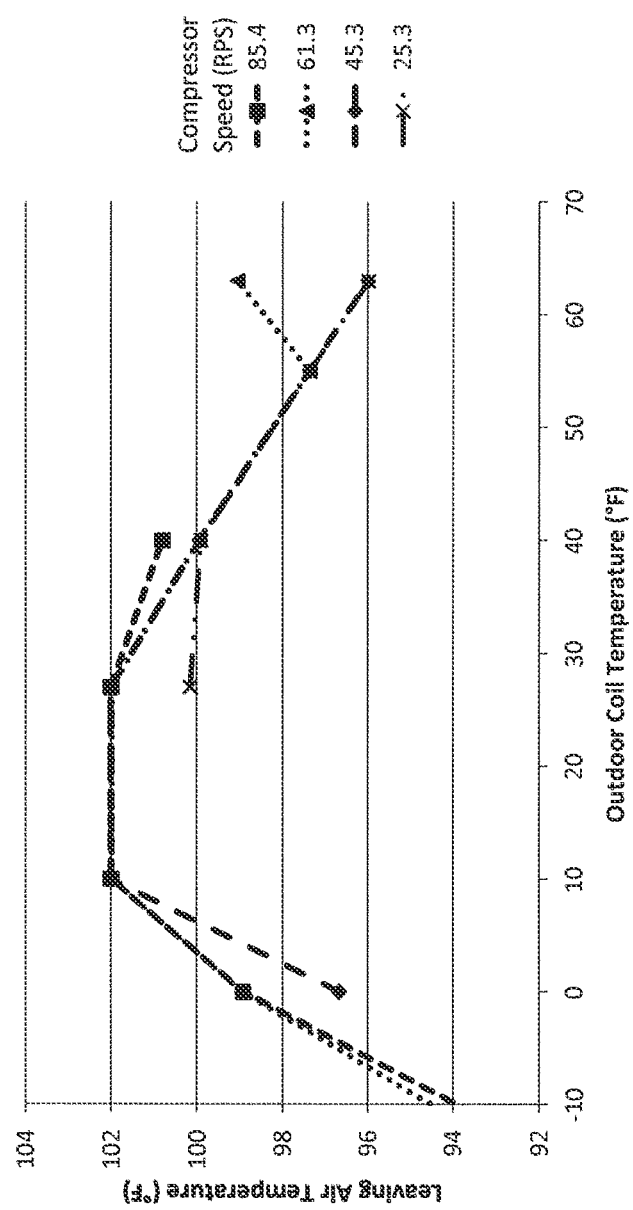
FIG. 4 provides a graph illustrating leaving air temperature as a function of leaving outdoor heat exchanger coil temperature.
Figure 5:
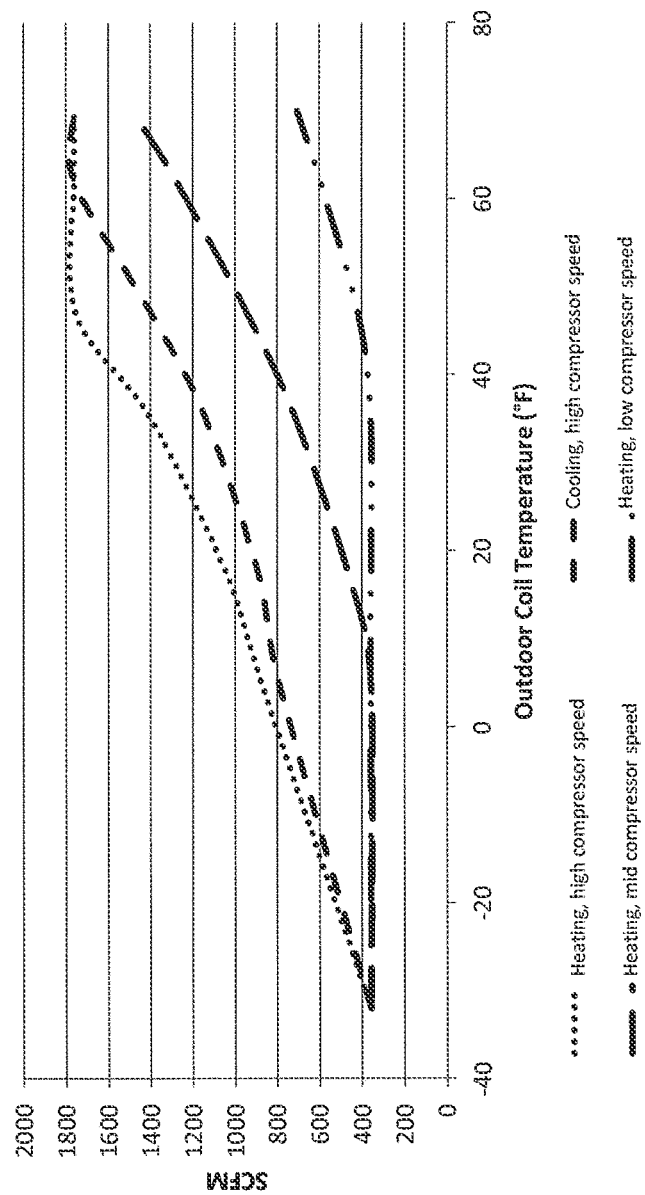
FIG. 5 provides a graph illustrating airflow as a function of outdoor heat exchanger coil temperature.

FIG. 4 illustrates exemplary results of one such operation 302, wherein the leaving air temperature ($T_L$) is shown as a function of the temperature of the outdoor heat exchanger 104, which is an outdoor heat exchanger coil, and compressor speed. Again, according to certain embodiments, the temperature of the outdoor heat exchanger 104 may be reflective or indicative of the temperature of refrigerant at the outdoor heat exchanger 104. The volumetric airflow ($\dot{V}$) is then calculated in operation 304 using the equation:

$$\dot{V} = \frac{Q}{(T_{TL} - T_E) * c}$$

wherein $T_{TL}$ is the target leaving temperature, $T_E$ is temperature of the air entering the condenser, Q is the heating capacity of the indoor heat exchanger 102 (acting as the condenser), and c is a constant combining unit conversions and specific heat of dry air. As the outdoor ambient temperature and heat exchanger temperature decrease, the target leaving air temperature ($T_{TL}$) is increased. For example, in iterations in which the outdoor ambient temperature ($Amb_m$) is 60° Fahrenheit, the target leaving air temperature ($T_{TL}$) may be about 95° Fahrenheit, whereas in iterations in which the outdoor ambient temperature ($Amb_m$) is 30° Fahrenheit, the target leaving air temperature ($T_{TL}$) may be about 102° Fahrenheit. In the illustrated form, the volumetric airflow ($\dot{V}$) is measured in cubic feet per minute, target leaving and entering temperatures ($T_{TL}$, $T_E$) are measured in degrees Fahrenheit, heating capacity (Q) is measured in btu/h, and the constant c is 1.08. FIG. 5 illustrates exemplary results of an operation 304, wherein the indoor volumetric airflow rate (SCFM) is shown as a function of outdoor heat exchanger temperature (outdoor coil temperature according to the illustrated embodiment) and compressor speed.

According to the illustrated embodiment, the volumetric airflow ($\dot{V}$) calculated for the outdoor heat exchanger temperature (OD Coil Temperature) and the compressor speed ($RPS_n$) from operation 304 is then stored in an airflow table as $CFM_{m,n}$. Table 1 illustrates an exemplary airflow table which may be used as the airflow table 132, wherein the airflow is expressed as a percentage of the maximum allowed airflow.

TABLE 1

Airflow table

| | | Outdoor Coil Temperature (° F.) | | | | | | |
|---|---|---|---|---|---|---|---|---|
| | | −32 | 0 | 10 | 28 | 40 | 55 | 60 |
| Compressor Speed (RPS) | 52.8 | 26 | 54 | 63 | 86 | 100 | 100 | 100 |
| | 40 | 26 | 45 | 51 | 67 | 82 | 100 | 100 |
| | 28.7 | 26 | 26 | 30 | 46 | 60 | 81 | 94 |
| | 16.7 | 26 | 26 | 26 | 26 | 31 | 43 | 51 |

With additional reference to FIGS. 1 and 2, using the airflow table 132, the inverter drive 131 may determine the desired airflow, and thus the desired speed of indoor blower 122, using bilinear interpolation. The inverter drive 131 may then issue a corresponding speed command to the indoor blower 122 by any technique known in the art. For example, when the outdoor heat exchanger temperature is 10° Fahrenheit and the compressor speed is 40 RPS, the speed command may include a pulse-width modulated (PWM) signal having a duty cycle of 51.

During transient conditions such as defrost, the outdoor heat exchanger 104 may function as a condenser and thus the outdoor heat exchanger 104 may not be used for providing a heated airflow. Thus, during such conditions, the airflow may be controlled by the controller 130. Further, according to certain embodiments, during such transient conditions, a mitigation strategy may be employed. More specifically, in certain embodiments, the real time outdoor heat exchanger temperature is not used during transient conditions. Instead, the outdoor heat exchanger temperature may be read just before entering defrost, and the read outdoor heat exchanger temperature may be used to preload the averaging algorithm for use after defrost has ended. Such use of the read outdoor heat exchanger temperature, which, according to certain embodiments, may occur generally immediately after defrost, may allow for a relatively smooth airflow transition from heating to defrost and back to heating modes. Further, during the defrost mode, the indoor airflow may remain fixed at the final heating airflow value. Additionally or alternatively, the outdoor heat exchanger temperature may be highly filtered. For example, a floating point average temperature for the outdoor heat exchanger 104 over a predetermined time period may be used. In certain embodiments, the time period may be in the range of about 10 minutes to about 60 minutes, although other time periods are contemplated. A rolling buffer may also be used, such that new outdoor heat exchanger temperature values are constantly read in and values older than the desired time period are discarded.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary. Further, when the language "at least a portion" and/or "a portion" is used the item may include a portion and/or the entire item unless specifically stated to the contrary.

The invention claimed is:

1. A method for heating an airflow, the method comprising:
   sensing a temperature of a first heat exchanger; identifying a speed of a compressor, the compressor adapted to compress a refrigerant;
   determining a heating capacity of a second heat exchanger;
   determining a target leaving temperature from the second heat exchanger;
   measuring an inlet temperature of air entering the second heat exchanger;
   determining a volumetric air flow based on the determined heating capacity, the target leaving temperature and the inlet temperature;
   determining a blower speed for an air blower using the temperature of the first heat exchanger, the speed of the compressor and the volumetric air flow; and
   operating the air blower at the determined blower speed to direct a flow of air across the second heat exchanger to heat the airflow to a leaving air temperature.

2. The method of claim 1, wherein the first heat exchanger is an outdoor heat exchanger, the second heat exchanger is an indoor heat exchanger, and the air blower is an indoor air blower.

3. The method of claim 2, wherein the first heat exchanger is an evaporator and the second heat exchanger is a condenser.

4. The method of claim 3, wherein the step of detecting the temperature of the first heat exchanger indicates a temperature of the refrigerant at the first heat exchanger.

5. The method of claim 4, further including the step of determining a target air leaving temperature for the heated airflow, and wherein the step of determining the blower speed includes determining an operating speed for the air blower for the leaving air temperature to be approximately equal to the target air leaving temperature.

6. The method of claim 3, further including the steps of:
   sensing, by a temperature sensor, an outside ambient temperature;
   determining, by a command apparatus, a target leaving air temperature for the heated airflow, the target leaving air temperature being variable based on the sensed outside ambient temperature; and
   wherein the step of determining the blower speed includes determining an operating speed for the air blower that allows the leaving air temperature to be approximately equal to the target air leaving temperature.

7. The method of claim 6, wherein the target leaving air temperature when the outside ambient temperature is below approximately 5° Fahrenheit is approximately 90° Fahrenheit to approximately 100° Fahrenheit.

8. The method of claim 6, wherein the target leaving air temperature when the outside ambient temperature is between approximately 5° Fahrenheit and approximately 40° Fahrenheit is approximately 100° Fahrenheit to approximately 105° Fahrenheit.

9. The method of claim 6, wherein the target leaving air temperature when the outside ambient temperature is above approximately 40° Fahrenheit is approximately 95° Fahrenheit to approximately 100° Fahrenheit.

10. A method for providing a heated airflow, the method comprising:
    sensing a heat exchanger temperature of a first heat exchanger;
    determining a system heating capacity based at least in part on a sensed outside ambient temperature and a speed of a compressor, the compressor adapted to compress a refrigerant;
    determining an indoor volumetric airflow flow rate for a flow of air across a second heat exchanger based at least in part on the determined system heating capacity and the heat exchanger temperature; and
    determining a blower speed for an air blower based at least in part on the determined indoor volumetric airflow rate and the heat exchanger temperature; and
    operating the air blower at the determined blower speed to facilitate the flow of the air across the second heat exchanger.

11. The method of claim 10, wherein the first heat exchanger is an outdoor heat exchanger that provides an evaporator and the second heat exchanger is an indoor heat exchanger that provides a condenser.

12. The method of claim 11, wherein the determined heat exchanger temperature indicates a temperature of the refrigerant at the first heat exchanger.

13. The method of claim 12, further including the step of identifying, during a transient event, the heat exchanger temperature before the transient event, the identified heat exchanger temperature being used to determine the heat exchanger temperature that is to be used in determining the indoor volumetric airflow rate and the blower speed during at least the transient event.

14. The method of claim 13, wherein the heat exchanger temperature used during the transient event is a floating point average temperature.

15. The method of claim 11, wherein the step of determining the system heating capacity is further based on a leaving air temperature, and wherein the step of determining the indoor volumetric airflow rate is further based on a temperature of an airflow at an inlet of a condenser.

16. An apparatus for heating an airflow using a refrigerant, the apparatus comprising:
    a compressor adapted to operate at a compressor speed to compress the refrigerant;
    a first heat exchanger in fluid communication with the compressor;
    a temperature sensor positioned to sense a temperature of the first heat exchanger;
    a second heat exchanger in fluid communication with the first heat exchanger;
    an air blower adapted to operate at one or more variable blower speeds, the air blower further adapted to facilitate a flow of air across at least a portion of the second heat exchanger; and
    a command apparatus having a memory, the command apparatus adapted to define:
      the one or more variable blower speeds for operation of the air blower based on the compressor speed;
      a system heating capacity;
      an indoor volumetric airflow flow rate for a flow of air across the second heat exchanger based at least in part on the determined system heating capacity and the heat exchanger temperature; and a blower speed for a second air blower based at least in part on the determined indoor volumetric airflow rate and the temperature of the first heat exchanger.

17. The apparatus of claim 16, wherein the temperature of the first heat exchanger indicates a refrigerant temperature of refrigerant at the first heat exchanger.

18. The apparatus of claim 17, wherein the first heat exchanger is an evaporator and the second heat exchanger is a condenser.

19. The apparatus of claim 18, wherein the first heat exchanger is an outdoor heat exchanger and the second heat exchanger is an indoor heat exchanger.

20. The apparatus of claim 16, wherein the command apparatus is an inverter drive.

21. A method for heating an airflow, the method comprising:

sensing a temperature of a first heat exchanger; identifying a speed of a compressor, the compressor adapted to compress a refrigerant;

determining a blower speed for an air blower using the temperature of the first heat exchanger and the speed of the compressor;

operating the air blower at the determined blower speed to direct a flow of air across a second heat exchanger to heat the airflow to a leaving air temperature;

wherein the first heat exchanger is an outdoor heat exchanger, the second heat exchanger is an indoor heat exchanger, and the air blower is an indoor air blower;

wherein the first heat exchanger is an evaporator and the second heat exchanger is a condenser;

further including the steps of: sensing, by a temperature sensor, an outside ambient temperature; determining, by a command apparatus, a target leaving air temperature for the heated airflow, the target leaving air temperature being variable based on the sensed outside ambient temperature;

wherein the step of determining the blower speed includes determining an operating speed for the air blower that allows the leaving air temperature to be approximately equal to the target air leaving temperature;

wherein the target leaving air temperature when the outside ambient temperature is below approximately 5° Fahrenheit is approximately 90 20 Fahrenheit to approximately 100° Fahrenheit;

wherein the target leaving air temperature when the outside ambient temperature is between approximately 5° Fahrenheit and approximately 40° Fahrenheit is approximately 100° Fahrenheit to approximately 105° Fahrenheit; and wherein the target leaving air temperature when the outside ambient temperature is above approximately 40° Fahrenheit is approximately 95° Fahrenheit to approximately 100° Fahrenheit.

22. The method of claim 21, wherein the step of detecting the temperature of the first heat exchanger indicates a temperature of the refrigerant at the first heat exchanger; and the method further including the step of determining a target air leaving temperature for the heated airflow, and wherein the step of determining the blower speed includes determining an operating speed for the air blower for the leaving air temperature to be approximately equal to the target air leaving temperature.

* * * * *